United States Patent [19]

Stone et al.

[11] Patent Number: 5,700,497
[45] Date of Patent: Dec. 23, 1997

[54] VIBRATORY AGGLOMERATOR

[75] Inventors: Lawrence H. Stone, Rivervale; William J. Zhao, Livingston; Hossein Alamzad, Weehawken, all of N.J.

[73] Assignee: Kason Corporation, Millburn, N.J.

[21] Appl. No.: 489,449

[22] Filed: Jun. 12, 1995

[51] Int. Cl.[6] ................................................ B29C 67/02
[52] U.S. Cl. .................. 425/222; 425/456; 264/117; 209/252; 209/254; 209/315; 209/325
[58] Field of Search ..................... 425/222, 456; 264/117; 209/254, 244, 247, 252, 315, 325, 331

[56] References Cited

U.S. PATENT DOCUMENTS

| | | | |
|---|---|---|---|
| 2,411,873 | 6/1946 | Firth | 425/222 |
| 2,684,290 | 7/1954 | Alexander et al. | 425/222 |
| 2,914,797 | 12/1959 | Cavanagh . | |
| 3,210,772 | 10/1965 | Stirling | 425/222 |
| 3,452,868 | 7/1969 | Miller | 209/254 |
| 3,530,986 | 9/1970 | More et al. | 209/254 |
| 3,741,703 | 6/1973 | Reynolds . | |
| 3,756,761 | 9/1973 | Fernandes | 425/222 |
| 3,779,381 | 12/1973 | Armstrong | 209/271 |
| 3,819,050 | 6/1974 | Lower | 209/254 |
| 4,351,719 | 9/1982 | Morey | 209/244 |
| 4,588,366 | 5/1986 | Glatt . | |
| 5,019,302 | 5/1991 | Sparks et al. . | |

Primary Examiner—Jay H. Woo
Assistant Examiner—Ivrie A. Schwartz
Attorney, Agent, or Firm—Stanley J. Yavner

[57] ABSTRACT

An agglomerator structure, used in conjunction with a sifting structure, is described to provide variable sized agglomerates and uniform agglomeration, using at least one cone, with apex pointing toward the feed flow, and an inverted cone with a screen below. The agglomerator structure is provided to enable convenient use in a sanitary environment, with the system including an agglomerator cone above the inverted cone, which defines a central opening for feeding the material to one or more screens. The system is primarily designed for use with a vibration-imparting structure to better enable use in a sanitary environment.

6 Claims, 3 Drawing Sheets

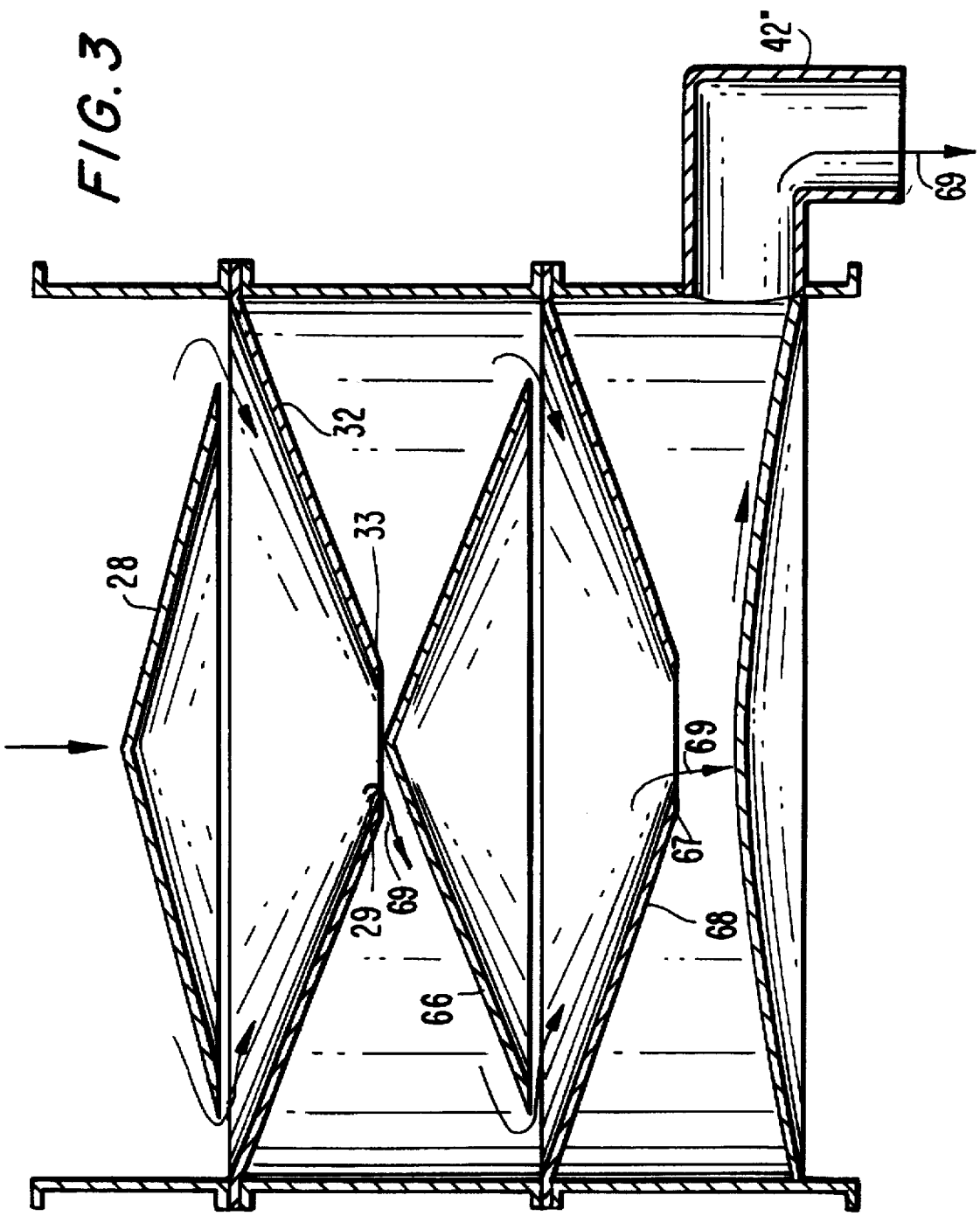

VIBRATORY AGGLOMERATOR

FIELD OF THE INVENTION

This invention relates primarily to agglomerators for use with fertilizers, waste materials, ceramics, minerals, chemicals, food stuffs, detergents and other applications. More particularly, this invention relates to agglomerators which are suitable for use in sanitary applications.

BACKGROUND OF THE INVENTION

Normally, agglomerators of materials, whereby dry materials are processed into larger and more uniform particles, is a process enabled by the use of a flat or curved plate upon which rotation of the plate, when sprayed with water or other binders, pelletizes powdered or fine material or particles by rolling such particles or the like upon each other, the moisture causing adherence between them. However, such agglomerators suffer from the disadvantage that they are difficult to use in a sanitary environment.

Of course, in the prior art, there are many examples of agglomerators wherein rotated pellet nuclei with a high moisture content are rolled upon themselves to cause the pellets to grow. However, such existing structures and systems are likewise not conducive to operating in a sanitary environment, nor are they controllable sufficiently to produce significant uniformity. An example of such prior art systems and structures is U.S. Pat. No. 2,914,797, assigned to Ontario Research Foundation of Toronto, Ontario, Canada, and now expired. Specifically, the Ontario Research system and structure includes a rotating shaft 16 for interconnection with member 24, as an example, whereby at the points of intersection and connection therebetween, it is difficult to maintain a sanitary environment.

Also, other prior art patents have proven to be overly complex and likewise not suitable to a sanitary invironment, such as U.S. Pat. Nos. 3,741,703, 4,588,366 and 5,019,302 to Reynolds, Glatt and Sparks, respectively.

OBJECTS OF THE INVENTION

Accordingly, a primary object of the present invention is to provide an agglomerator structure and system which is suitable for use in a sanitary environment.

A further, and more particular object of the present invention is to provide a relatively simple agglomerator, in terms of its structure, to avoid the necessity for use of complex elements, and yet to satisfy the objectives and accomplishments of the present invention.

A still further object of the present invention is to provide an agglomerator which is particularly suitable for performing agglomeration with a uniform output.

These and other objects of the present invention are provided in an agglomerator for use with a vibration-imparting structure, which features an agglomeration cone or a series of agglomeration cones, including at least one inverted agglomeration cone, which includes upstanding side walls and defines, at or near the center of the inverted agglomeration cone, an output opening. Below the output opening are arranged one or more screens for separating agglomerated product, by particle size, from other products of the system. In one embodiment, a single screen is used below the inverted agglomeration cone in order to separate from the agglomerated product, undersized material (fines) for rejection or further processing. Another embodiment of the present invention features a pair of screens, with the desired agglomerated product being claimed from between the screens, so that oversized particles and fines are both separated for rejection or reprocessing. Still further, a plurality of cones and inverted cones are used to accomplish agglomeration with an increase in the size of the agglomerated product due to increased residence time or dwell time during the processing. Further size and processing adjustments are within the capability of the structure presented in the preferred and alternative embodiments by means of adjusting the angles of the cone walls with the horizontal, or the like.

BRIEF DESCRIPTION OF THE DRAWINGS

Other objects, features and advantages of the present invention will become apparent from the following more detailed description of a preferred, but nonetheless illustrative, embodiment, with reference to the accompanying drawings, wherein:

FIG. 3 is a schematic representation of an alternative structure of an agglomerator according to the present invention, but with an additional cone and inverted cone stage for increasing the size of the agglomerated product.

DETAILED DESCRIPTION OF THE PREFERRED AND ALTERNATIVE EMBODIMENTS

The agglomerator structure of the present invention is used in a system which enables a multiplicity of input capabilities. For instance, a granulator or sifter input whereby a powdered material already exposed to a binder is put into the granulator or sifter, for instance, in order to enable proper processing of a material such as Teflon, which requires a longer time to absorb the binder. In any event, the granulated or sifted material with the binder is then caused to enter the agglomerator of the present invention.

Another input alternative would be similar to that stated above, but the binder would not be added until a dry material is already granulated or sifted, and ready for input to the agglomerator of the present invention. Still another alternative for adding the binder, would be during initial aggitation or vibration of the material as it contacts the apex-up cone 28 of the present invention.

In all embodiments of the present invention, wipers and/or polished surfaces (not shown) are usable for enhancing the capability of cone 28, with respect to operation with the present invention. Also, it should be understood that the polishing of other parts of the agglomerator, as described herein, may enhance performance of the present invention.

Figure 1:
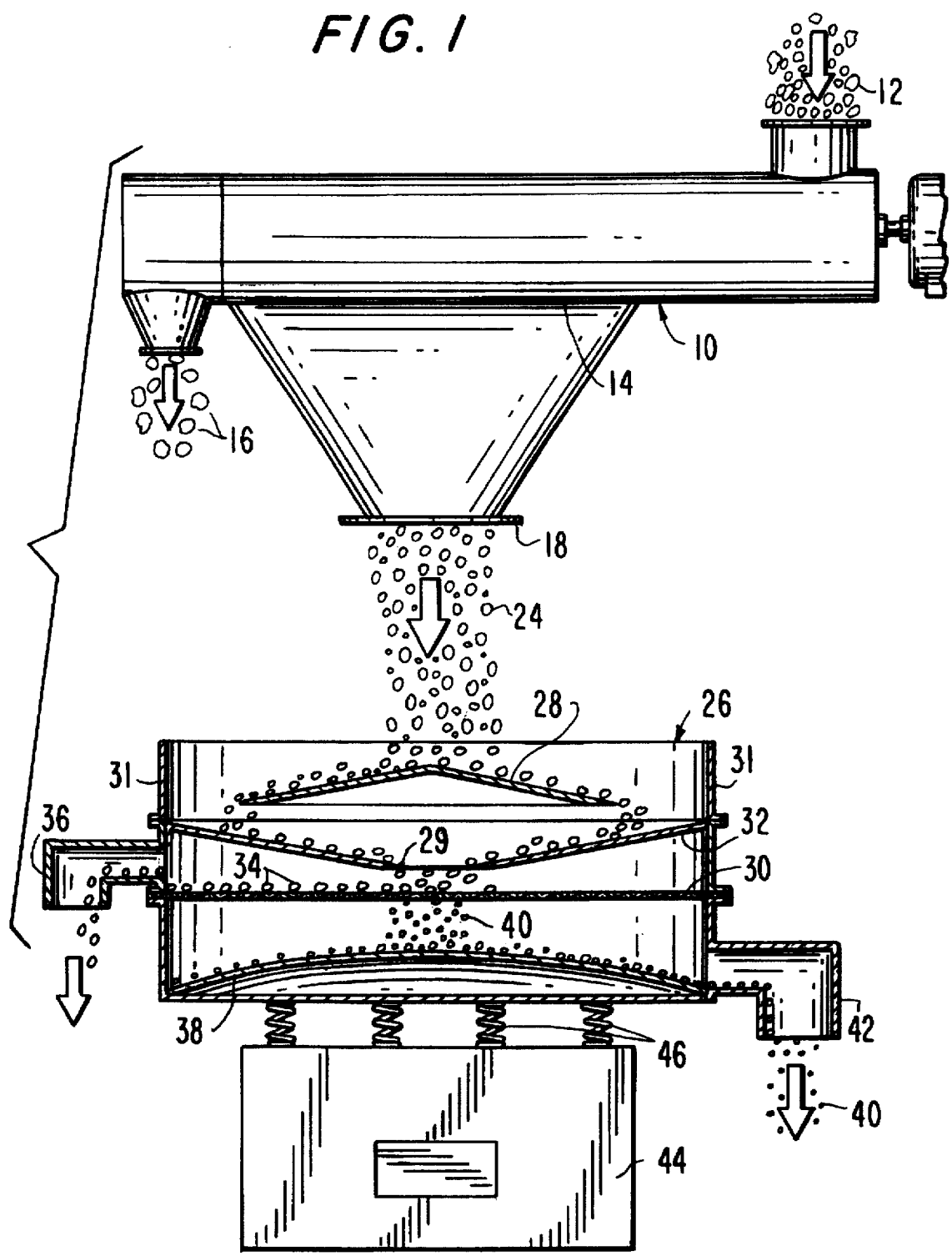
FIG. 1 is a schematic view of an agglomerator, which receives its input from a granulator device.

Referring to the drawings, and particularly FIG. 1 thereof, a vibration-imparting structure base 44, as is well known in the art, is used to impart vibration to the agglomerator as described herein. Base 44 includes or supports, for example, a motor, and unbalanced weights or other vibration-imparting devices, so that the agglomerator, generally designated 26, rests on springs or mounts 46, which in turn, are mounted on base 44.

Agglomerator 26, with any of the input systems detailed above, includes cone 28, inverted cone 32, with cone 28 arranged in an apex-up orientation as shown, above inverted cone 32. Inverted cone 32 includes upstanding walls 31, also acting as a frame for the agglomerator 26, and defines at its center, opening 29.

Below opening 29 is arranged a screen 30 in order to provide the selection capability for the materials 34 which flow through opening 29. Of course, the agglomerator is fully capable of performing its agglomeration functions without a screen. Thus, the agglomerated product 34 can be taken from above screen 30, through output port 36; and the fines 40 exit through port 42 arranged below screen 30. Discharge dome 38 is placed below screen 30 to enable this selection process. Fines 40 are then either reprocessed or rejected.

This represents a basic system according to the present invention when there is a need to agglomerate fine particles into uniform, larger particles in order to improve physical properties such as flowability, wetability, dust control and the like. Also, it is important to provide the capability for such agglomerator in a sanitary environment.

According to one embodiment of the invention, FIG. 1 shows a centrifugal sifter or granulator, generally designated 10 which is arranged to provide an input to agglomerator 26. Assuming the feed material 12 has characteristics of damp clay or mud (a binder already added), the centrifugal sifter rejects oversized particle 16 and provides the selected material 24 through screen 14 for output through sifter port 18. The selected material 24 is then in granular form for contacting agglomerating cone 28. The granular material, under the influence of vibratory structure base 44, impacts one particle on the other and with a circular vibratory motion eventually runs off the cone 28 onto inverted cone 32. With the same type of vibratory circular motion, under the influence of the operation of structure 44, the contacting particles flow out through opening 29 from inverted cone 32, and onto screen 30. At this point in time, still vibrating, the agglomerator product 34, uniformly spherical, is taken out through port 36, and fines 40 move out from discharge dome 38 through port 42.

Figure 2:
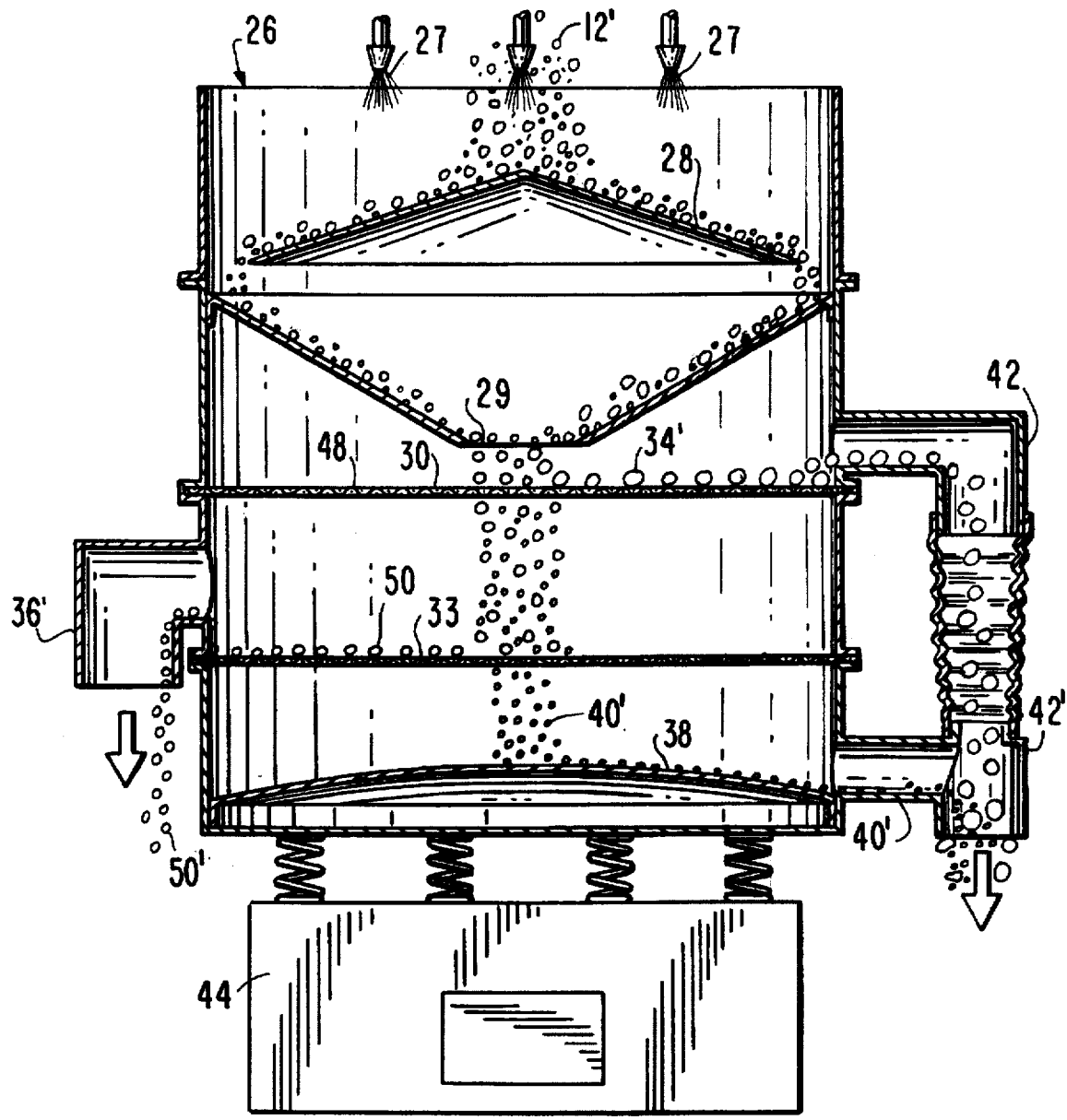
FIG. 2 is an illustrative embodiment of the agglomerator shown in FIG. 1, but with two screens below the agglomerated product discharge; the top screen removes oversized products and the bottom screen removes fine material, with the desired product withdrawn from between the screens.

FIG. 2 shows an alternate embodiment, whereby a binder is not added until the input powder 12' enters the input end of vibrating agglomerator 26, the binder 27 provided by jets of mist or the like added at the input end of agglomerator 26. The input powder 12' is provided by a granulator or sifter, such as that shown in FIG. 1, or without use of a granulator or sifter when the material is provided for the process in powdered form.

Also, as shown in FIG. 2, multiple screens 30, 33 are provided below opening 29 so that oversized agglomerates 34' exit for reprocessing or rejection through port 42; and fines 40', below screen 33, traverse dome 38 for exiting through connected output port 42'. The selected agglomerated product 50 is taken from port 36', from in between screens 30, 33.

FIG. 3 shows a tandum arrangement of two sets, each having a cone and an inverted cone. The first set of cone 28 and inverted cone 32, defining opening 29, is arranged over cone 66 and inverted cone 68, which also defines opening 67 for the processing and exiting of agglomerated product in the direction of arrows 69 to port 42".

The arrangement of FIG. 3 enables a different level of agglomeration, when compared with the prior art or the arrangements shown in FIGS. 1 and 2 hereof. Likewise, the final particle size of any agglomeration as taught herein, is a function of the frequency of vibration, the amplitude of vibration, the contact angle with which the particle hits the cone, the length of time the particle is subject to vibration, and the degree of polish for the various surfaces contacted by the particle, as well as other factors.

The invention as described herein, with its various embodiments as shown and taught herein, is considered illustrative of the present invention; nevertheless, the bounds of the invention are to be considered only in connection with the following claims:

What is claimed is:

1. An agglomerator for use in a vibration imparting structure, comprising a top cone having an apex and in an apex-up orientation, means for providing input of material to be agglomerated to said agglomerator, arranged above the apex of said cone, an inverted cone located below said top cone and defining at approximately its center an opening for the output of agglomerated particles, a wall upstanding from the periphery of said inverted cone, and means for vibrating said top cone and said inverted cone.

2. The invention according to claim 1 wherein a screen is provided and located below said opening for separating said output by particle size.

3. The invention according to claim 1 wherein two top cone-inverted cone sets are provided for said agglomerator, wherein the output through the opening in said first set feeds particles to the cones of said second set.

4. The invention according to claim 2 wherein a pair of screens are provided and the final product of said agglomerator is sized to desired final product specification between said screens.

5. The invention according to claim 1 wherein said material includes powder combined with a binder, and said means for providing input includes a granulator.

6. The invention according to claim 1 wherein a binder is provided to said material as said material is provided to said agglomerator.

* * * * *